(12) United States Patent
Reid et al.

(10) Patent No.: US 10,427,977 B2
(45) Date of Patent: Oct. 1, 2019

(54) FIRE RESISTANT GEOPOLYMER FOAM

(71) Applicant: Alsitek Limited, Peterborough Cambridgeshire (GB)

(72) Inventors: Michael Reid, Peterborough (GB); Harun Ihsan, Peterborough (GB)

(73) Assignee: Alsitek Limited, Peterborough Cambridgeshire (GB)

( * ) Notice: Subject to any disclaimer, the term of this patent is extended or adjusted under 35 U.S.C. 154(b) by 803 days.

(21) Appl. No.: 14/767,064

(22) PCT Filed: Apr. 9, 2014

(86) PCT No.: PCT/EP2014/057159
§ 371 (c)(1),
(2) Date: Aug. 11, 2015

(87) PCT Pub. No.: WO2014/166998
PCT Pub. Date: Oct. 16, 2014

(65) Prior Publication Data
US 2015/0376062 A1 Dec. 31, 2015

(30) Foreign Application Priority Data

Apr. 10, 2013 (GB) .................................. 1306483.7
Jul. 10, 2013 (GB) .................................. 1312396.3

(51) Int. Cl.
C04B 28/00 (2006.01)
C04B 28/26 (2006.01)
C04B 38/02 (2006.01)
C04B 40/06 (2006.01)
C04B 38/00 (2006.01)
C04B 111/00 (2006.01)
C04B 111/28 (2006.01)

(52) U.S. Cl.
CPC .......... C04B 28/006 (2013.01); C04B 28/008 (2013.01); C04B 28/26 (2013.01); C04B 38/0067 (2013.01); C04B 38/02 (2013.01); C04B 40/065 (2013.01); *C04B 2111/00663* (2013.01); *C04B 2111/28* (2013.01); *Y02P 40/165* (2015.11)

(58) Field of Classification Search
CPC .................................................. C04B 28/008
See application file for complete search history.

(56) References Cited

U.S. PATENT DOCUMENTS

| 5,565,026 A | 10/1996 | Hense et al. |
| 2014/0264140 A1* | 9/2014 | Gong .................... C04B 28/006 252/62 |

FOREIGN PATENT DOCUMENTS

| DE | 3229339 | 2/1984 |
| DE | 4414259 | 2/1995 |
| DE | 29600466 | 5/1996 |
| DE | 29600466 U1 * | 5/1996 |
| DE | 19717330 | 10/1998 |
| DE | 19725761 | 12/1998 |
| DE | 10360029 | 7/2005 |
| EP | 0495336 | 7/1992 |
| FR | 2512805 | 9/1981 |
| JP | 05051975 | 3/1993 |
| WO | WO-1997/25291 | 7/1997 |
| WO | WO2008/113609 | 9/2008 |

OTHER PUBLICATIONS

European Search Report for UK Application No. GB1306483.7, dated Oct. 3, 2013.
English translation of Abstract for DE10360029.
English translation of Abstract for DE19725761.
English translation of Abstract for DE19717330.
English translation of Abstract for DE3229339.
Machine translation (English) of EP0495336.
Official action dated Mar. 13, 2017 for European Patent Application No. EP14716803.3.

* cited by examiner

*Primary Examiner* — Peter F Godenschwager
(74) *Attorney, Agent, or Firm* — Julie K. Staple; Dinsmore & Shohl LLP

(57) ABSTRACT

Use of a foamed geopolymer as a fire-resistant sealant material, a method of sealing an aperture or cavity for housing services in a building comprising (i) applying a curable foamed geopolymer composition to the aperture or cavity; and (ii) curing the foamed geopolymer composition, thereby creating a seal in the aperture or cavity; and wherein the cured foamed geopolymer has fire-resistant properties, and a kit of parts for preparing a foamed geopolymer for use as a fire-resistant sealant material, comprising (i) a container holding a dry mixture of components suitable for preparing a foamed geopolymer including a blowing agent and (ii) a container holding an aqueous alkaline liquid mixture of components suitable for preparing a geopolymer.

10 Claims, 5 Drawing Sheets

FIRE RESISTANT GEOPOLYMER FOAM

The present invention relates generally to sealant materials, especially those with fire-resistant properties. In particular, the present invention relates to the use of foamed geopolymers as fire-resistant sealant materials, to methods of using the foamed geopolymers as sealant materials and to a kit of parts relating to fire-resistant foamed geopolymers.

During the construction of a structure such as a building (eg, a house or office building), it is often necessary to establish pathways throughout the building for the passage of services, such as electrical wiring, gas pipes and water drainage conduits, etc. Accordingly, integrated into the building during construction will be apertures and/or cavities for the positioning of the services, which may be essential for the human habitation of the building. By way of example, such an aperture or cavity may be an opening in a floor area between two levels of a building for vertically passing a water pipe or a bundle of electrical wires.

Such an opening will be formed in a manner unlikely to be of a width or dimension corresponding closely or exactly to those of the pipe or wires, and will most likely be substantially greater. Accordingly, it will often be necessary to close-up and seal the opening once the pipe or wires are fed through and positioned in the opening in the desired manner. This sealing is for functional reasons, such as for the securing of the pipes or wires in place, safety reasons such as to seal the floor to assist in fire and/or flood control, and also for aesthetic reasons.

A prior art means for addressing these objectives is by a manual process during building construction involving a site worker trowelling a plaster-based filler composition (eg, Nullifire B220 fire stop compound) into and around such openings to make the desired seal around the services. However, this approach suffers from several problems, not least that it is time-consuming and labour-intensive. This is because this approach often requires the careful application of the filler composition to the opening, which may have an irregular shape and often not be easily accessible to the person trowelling the filler composition. The present invention seeks to ameliorate the problems encountered using the prior art approach.

According to the present invention, there is provided the use of a foamed geopolymer as a fire-resistant sealant material.

Further according to the invention, there is provided a method of sealing an aperture or cavity for housing services in a structure such as a building comprising:
(i) applying a curable foamed geopolymer composition to the aperture or cavity; and
(ii) curing the foamed geopolymer composition to a foamed geopolymer, thereby creating a seal in the aperture or cavity; and
wherein the cured foamed geopolymer has fire-resistant properties.

Even further according to the invention, there is provided a kit of parts for preparing a foamed geopolymer for use as a fire-resistant sealant material, comprising:
(i) a container holding a dry mixture of components suitable for preparing a foamed geopolymer including a blowing agent; and
(ii) a container holding an aqueous alkaline liquid mixture of components suitable for preparing a geopolymer.

The present invention provides a quick, efficient and practical way for providing a lightweight sealant material for use in places like building construction sites where apertures and/or cavities need to be sealed. Particularly those which are required to house or fix in place services such as wires, cables and pipes.

Other important beneficial features of the present invention are that the use of the foamed geopolymers with their inherent fire-resistant properties can enable crucial legal and safety requirements for such sealants. Furthermore, because of the lightweight characteristics of employing a foam, less of the geopolymer material is required compared to the prior art non-foamed filler resulting in a more cost-effective process of filling/sealing in and around apertures and/or cavities.

The effectiveness and practicality of using the foamed geopolymers in accordance with the invention is particularly apparent because rather than having to manually trowel a filler composition into difficult to access areas such as described for the prior art embodiments, the curable foamed geopolymer composition is simply poured into an aperture or cavity such that when it simultaneously cures and foams, it expands to substantially fill the space defined by the aperture or cavity. This includes space between and around pipes and wires, where access is not easy. If too much of the curable geopolymer composition is applied to the aperture or cavity such that there is an overflow, the user can simply scrape away excess composition prior to the complete curing of the foamed geopolymer.

By way of definition, geopolymers are a class of synthetic aluminosilicate polymeric materials, which may also be referred to as mineral polymers. They are formed by reacting via dissolution an aluminosilicate in an alkaline silicate solution or an acidic medium, which upon condensation (curing) forms a mouldable, homogeneous polymeric product. Blowing (foaming) agents can be added to form a foamed geopolymeric material. Geopolymeric materials such as those used in accordance with the present invention have high fire resistance, retaining their integrity upon exposure to temperatures up to as much as 1200° C.

In the context of the present invention, the person skilled in the art will understand what is meant by a material which is a foamed geopolymer.

However, by way of example, a foamed material is a substance (eg, a particle or other object) that is formed by trapping pockets of gas in a solid. As a result, a proportion of the internal volume of a foamed substance is a gas such that the density of a substance is lowered the greater the content of gas. A foamed material will typically contain a network of gaseous voids (cells) throughout its volume which may take an open- or closed-cell arrangement. In accordance with the present invention, a foamed material will preferably have greater than 10%, and more preferably 40%, of its internal volume consisting of gaseous voids. Particularly preferably, the foamed material will have between about 40% and 65% of its internal volume consisting of gaseous voids.

Preferably, the cured foamed geopolymer material used in the invention has a density of 0.1 to 0.9 $g/cm^3$, and more preferably 0.3 to 0.8 $g/cm^3$.

In accordance with the present invention, use of a foamed geopolymer as a fire-resistant sealant may be for sealing an aperture or a cavity for housing or fixing services. Services can include, but are not limited to, electrical wiring, telecommunications cables, gas pipes, water-supply pipes and sewage pipes. The aperture may be an opening in the wall or a floor of a building through which it is necessary that the service runs. Otherwise, the foamed geopolymer may be used to fill in other cavities in a wall or floor, particularly where fixing of a wire, cable or pipe is required.

Preferably, the foamed geopolymer is prepared from a mixture comprising about 20-30% by weight of a metakaolin, about 20-30% by weight of a muscovite mica, about 35-50% by weight of an aqueous alkali metal silicate solution (with 15 to 45% by weight of alkali metal silicate), about 1-10% by weight of an alkali metal hydroxide, and about 0.1-5% by weight of a blowing (foaming) agent, up to 100% by weight.

More preferably, the foamed geopolymeric material is prepared from a mixture comprising about 23-28% by weight of a metakaolin; about 22-27% by weight of a muscovite mica; about 40-45% by weight of an aqueous alkali metal silicate solution; about 5-10% by weight of an alkali metal hydroxide; and about 0.1-3% by weight of the blowing agent, up to 100% by weight.

Even more preferably, the foamed geopolymeric material is prepared from a mixture comprising about 25% by weight of a metakaolin; about 24% by weight of a muscovite mica; about 41.5% by weight of an aqueous alkali metal silicate solution; about 8% by weight of potassium hydroxide (about 29% by weight of alkali metal silicate); and about 0.5% by weight of the blowing agent.

It is also understood in accordance with the present invention that, where appropriate, the amounts up to 100% by weight may be made up of one or more other component(s). Such component(s) may or may not have a material effect on the functionality of the resultant geopolymer material. The mixture for preparing the foamed geopolymer may contain an additional filler to muscovite mica. Such an additional filler may be selected from talcum, a starch material and/or a cellulose material. Preferably, the additional filler is rice flour. Preferably, the additional filler is present in the mixture for preparing the foamed geopolymer at about 5 to 15% by weight, 8 to 12% by weight or about 10% by weight.

Preferably, the alkali metal silicate is potassium silicate or sodium silicate, most preferably potassium silicate. Preferably, the alkali metal hydroxide is potassium hydroxide. Mixtures of the alkali metal silicate and alkali metal hydroxide with different cations may be used (eg, NaOH/KOH).

Preferably, the metakaolin is a calcined metakaolin. Most preferably, a metakaolin calcined at approximately 750° C. and milled to a fine powder.

A blowing (or foaming agent) is typically used in the preparation of the foamed geopolymer. This may be any blowing agent suitable in the preparation of geopolymeric materials including hydrogen peroxide, aluminium powder or zinc powder. However, finely divided aluminium powder (eg, mesh size range of 120-300) is preferred. Preferably, the blowing agent (eg, aluminium powder) is used in the preparation of the foamed geopolymeric compositions at 0.1-2% by weight, and even more preferably at 0.1-0.5% by weight. The use of a blowing agent such as aluminium powder at these amounts as a foaming agent, as well as imparting foaming attributes, also assists in the rapid but controlled curing of the foamed geopolymeric composition at ambient temperatures (eg, 0 to 30° C.), consistent with those experienced in a typical outdoor or indoor building construction site. Specifically, when a blowing agent such as aluminium powder comes into contact with the liquid alkali components of the foamed geopolymer preparation mixtures, heat and hydrogen gas are formed. The heat facilitates the rapid dissolution of the metakaolin component of the reaction mixture and thus assists the fast curing of the geopolymer, while the hydrogen gas acts as the blowing gas to impart the foamed feature of the foamed geopolymer.

In the kit of parts according to the invention, preferably (a) the dry mixture of components in a container (i) for preparing the foamed geopolymer comprises 20-30% by weight of a metakaolin; 20-30% by weight of a muscovite mica and 0.1-5% by weight of a blowing agent, and (b) container (ii) contains an aqueous liquid mixture comprising an alkali metal silicate and an alkali metal hydroxide present in a ratio of 1:2 to 25:1 by weight relative to each other, wherein the aqueous liquid mixture is present in container (ii) in an amount to a total of 100 by weight with reference to the dry mixture contents of container (i).

Preferably, the alkali metal silicate and the alkali metal hydroxide are present in the aqueous liquid mixture of container (ii) in a weight ratio between about 1:2 to 2.1, and preferably at about 1:1.

In accordance with the kit of the invention, the blowing agent may be present at 0.1-2% by weight, and preferably 0.1-0.5% by weight of the dry mixture components in container (i). Preferably, the dry mixture of container (i) comprises as a blowing agent aluminium powder. Particularly preferred is aluminium powder present at 0.1-0.5% by weight of the dry mixture components of container (i).

Preferably, the kit comprises more than one of container (i) and/or more than one of container (ii). Preferably, one or more of the components of the dry mixture of container (i) is in a powdered form.

Preferably, in the kit of the invention the container holding the aqueous alkaline liquid mixture of components is situated within the container holding the dry mixture of components. The container holding the aqueous alkaline liquid mixture of components is preferably readily rupturable. Preferably, the container holding the dry mixture of components comprises a gas-permeable, liquid impermeable material, such as a perforated plastics material. The perforated plastics material may be a polytertrafluoroethylene (PTFE) material (eg, Gore-Tex), or a polyethylene material. Preferably, the container holding the aqueous alkaline liquid mixture of components comprises a brittle material, such as a glass. Otherwise, it may comprise a rupturable rubber or plastics material, such as a rubber balloon or pouch.

To apply the curable foamed geopolymer composition used in accordance with the invention, the composition may be prepared with manual mixing by a site worker in a conventional manner, or else the composition may be prepared within a specially designed applicator and applied through a bespoke nozzle arrangement. By adding suitable amounts of the additional filler material (eg, rice flour), the curable foamed geopolymer composition may be prepared in a manner such that it has a workable dough-like consistency (ie, like a clay or putty). This stiff dough-like material can be manually manipulated by hand and easily positioned in vertical apertures and cavities (and the like) to seal off hard to access areas, in particular around pipes and cables. Once positioned, the curing geopolymer foam expands to tightly fill the aperture or cavity. Excess geopolymer foam protruding from the aperture or cavity can be removed by a knife or scraper prior to hardening, while still soft and workable.

As a further alternative, the composition may be prepared in situ within a sealed bag (pillow) containing a mixture of dry ingredients (eg, metakaolin, muscovite mica and aluminium powder) and a rupturable container (eg, a rubber balloon), wherein the rupturable container contains the alkaline aqueous liquid mixture (eg, solution of an alkali metal silicate and alkali metal hydroxide). In use, the rupturable container is manually manipulated by twisting or squeezing to rupture the liquid mixture container and permit the alkaline aqueous liquid mixture to contact the dry ingredients. Further manual manipulation of the sealed bag allows the contents of the bag to thoroughly mix such that they react to form a curing geopolymeric foam composition. At this stage, the bag can be positioned as desired in a space to be filled where the foam expands and cures (hardens) to fill the space, preferably without rupturing the sealed bag (pillow).

The present invention is now described with reference to the Figures of the accompanying drawing as follows.

A specific embodiment in accordance with the present invention is now described with reference to the diagrams of FIGS. 1a to 1d.

Figure 1A:
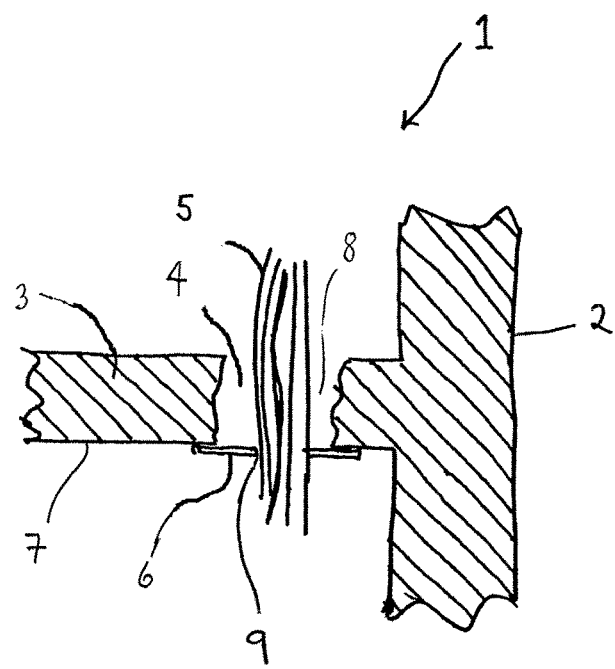
FIGS. 1a to 1d are diagrams representing the step-wise implementation of an embodiment in accordance with the use of the invention.

With reference to the diagram of FIG. 1a, there is shown a side-on profile of a junction 1 between a wall 2 and floor 3 in a building (not shown). Floor 3 has a vertical opening 4 through which electrical cables 5 are positioned in a pre-determined manner. The lower portion of opening 4 has a shuttering plate 6 fixed on a bottom surface 7 of floor 3 to form an open cavity 8. Electrical cables 5 pass through a hole 9 in shuttering plate 6.

Figure 1B:
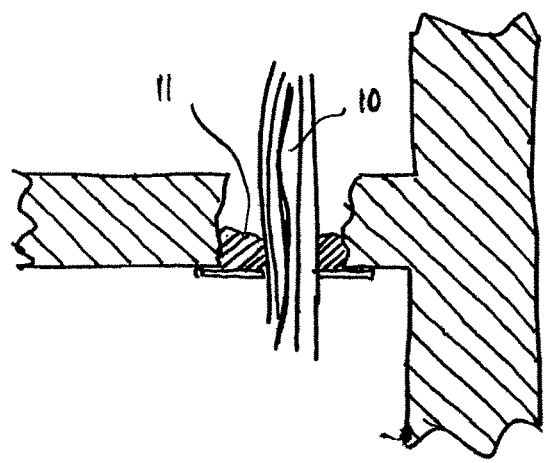

With reference to FIG. 1b, air spaces 10 are present between electrical cables 5. A liquid curable foamed geopolymer composition 11 is deposited into cavity 8. The liquid composition 11 is supported on shuttering plate 6 while curing takes place and has sufficient viscosity such that it does not flow through any gaps between the perimeter of hole 9 of shuttering plate 6 and electrical cables 5.

Figure 1C:
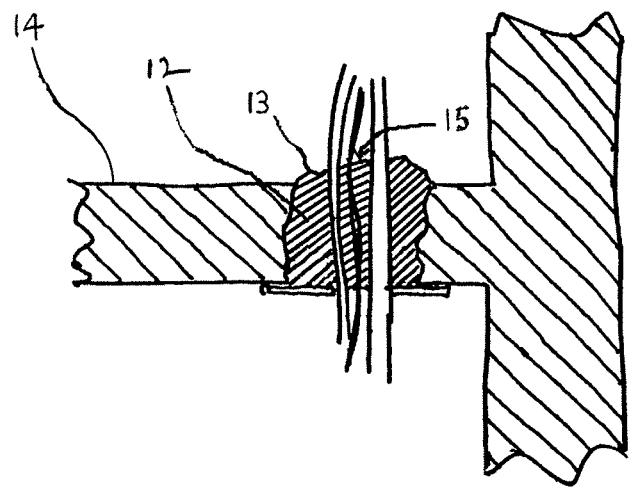

With reference to FIG. 1c, as a result of the foaming process, liquid composition 11 has expanded within cavity 8 to result in a near-cured solid foamed geopolymeric mass 12, whose upper surface 13 extends vertically above the level defined by top surface 14 of floor 3. Additionally, foamed geopolymeric mass 12 has permeated air spaces 10 as shown by arrow 15.

Figure 1D:
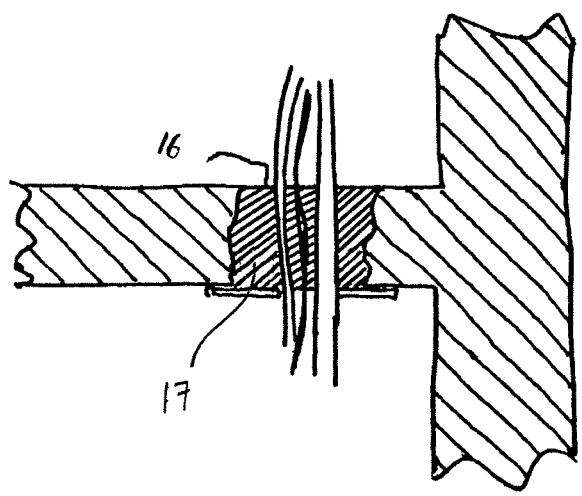

With reference to FIG. 1d, in order to align upper surface 13 with the level defined by top surface 14 to render an even surface, just prior to complete curing and whilst still capable of manipulation, foamed geopolymeric mass 12 is leveled by manual scraping (not shown) to remove excess geopolymer and to result in even surface 16 of foamed geopolymeric mass 12, substantially co-planar with top surface 14. After complete curing, cavity 8 has been filled (sealed) with a cured (solidified) foamed geopolymeric mass 17 which is a lightweight, fire-resistant material whereby electrical cables 5 are now fixed in position and a seal is created filling in opening 4 of floor 3.

Prior to deposition in cavity 8, liquid curable foamed geopolymer composition 11 is prepared as follows. Percentage by weight amounts are applicable to the whole of the curable composition.

In a suitable container (5 L), to a bulk dry mixture consisting of 25% by weight of metakaolin (Argical-M 1200S, AGS Minéraux) calcined at approximately 750° C.; 24% by weight of a muscovite mica (Imerys M814, Imerys) and 0.35% by weight of aluminium powder (200 mesh (75 micron), Sigma-Aldrich) is added a liquid aqueous mixture consisting of 42.5% by weight of a 29% by weight aqueous potassium silicate solution (Crosfield K66) with 8.15% by weight of potassium hydroxide dissolved therein. The mixture is stirred rapidly by manual stirring means to evenly distribute the dry mixture components with the aqueous liquid components.

As the onset of geopolymer curing and foaming is immediate, the mixture increases in viscosity to a level suitable for deposition in cavity 8.

Figure 2:
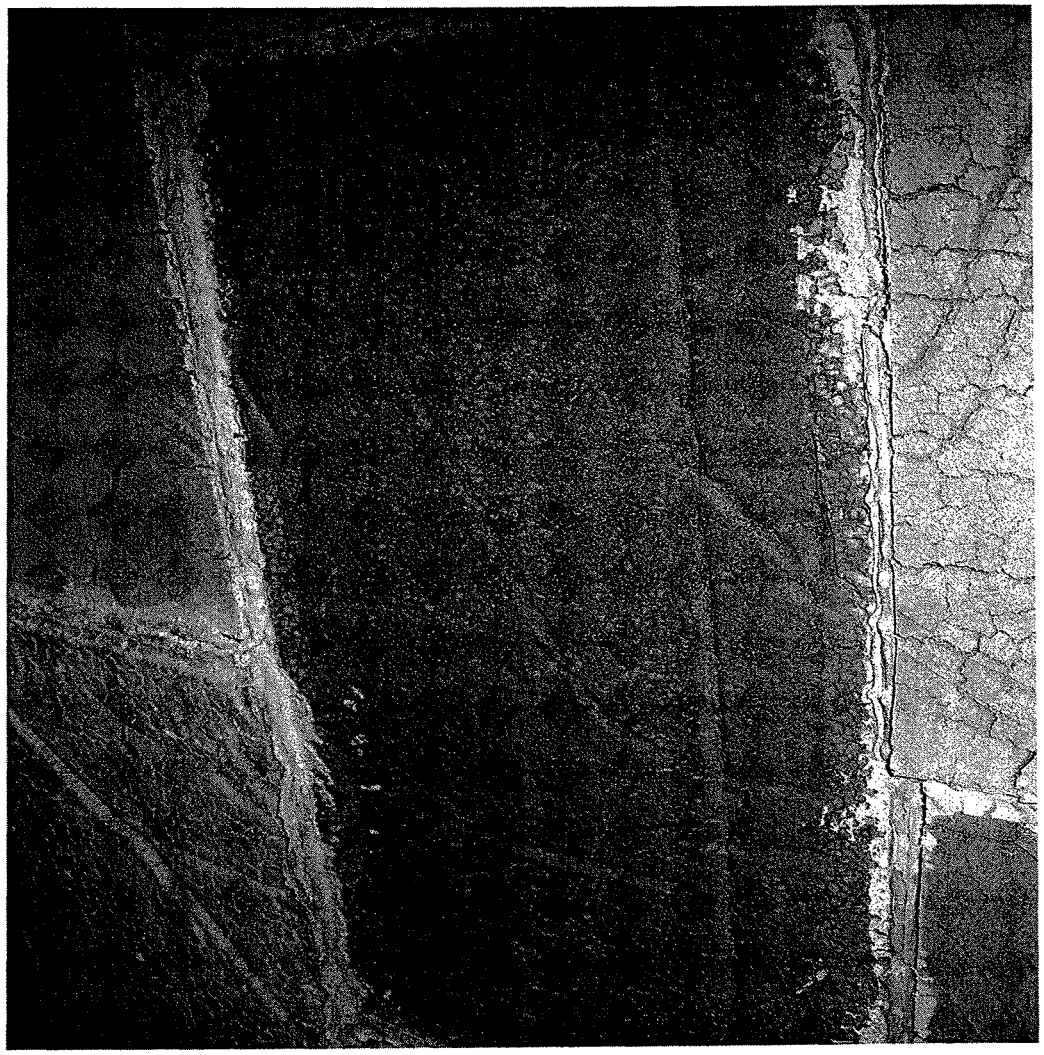
FIG. 2 is a photograph of a section of a test wall comprising a foamed geopolymeric block used in accordance with the invention (centre) surrounded by building blocks the upper right of which is made of the prior art Nullifire B220 fire stop compound after high-temperature heat exposure.

With reference to FIG. 2, a solid block of a foamed geopolymer used in accordance with the invention was prepared from the liquid curable foamed geopolymer composition 11 described above. The block (dark) of foamed geopolymer was incorporated into a test wall surrounded by similar dimension blocks (light) made from Nullifire B220 fire stop compound. The wall is of average thickness of 10 cm.

The wall was subjected to heat test conditions simulating a building fire in accordance with a standard procedure, wherein the temperature of an inside heat-facing surface of the wall was gradually raised to greater than 1000° C. over about a 30-minute period and was maintained at that temperature for 1.5 hours. For the duration of the heating, the outside surface of the wall temperature stays below 100° C. as determined by a thermocouple arrangement for the 2-hour duration of the test.

As can be seen from FIG. 2, the light blocks made of the prior art material have undergone significant and undesirable cracking as a result of the heat treatment compared to the dark block made of the foamed geopolymer. This demonstrates the superior fire resistant properties of the foamed geopolymer used in accordance with the present invention in comparison to the prior art material, thus demonstrating further the foamed geopolymer's effective usage as a fire-resistant sealant material.

A further specific embodiment in accordance with the present invention is described with reference to the diagrams of FIGS. 3a to 3c.

Figure 3A:
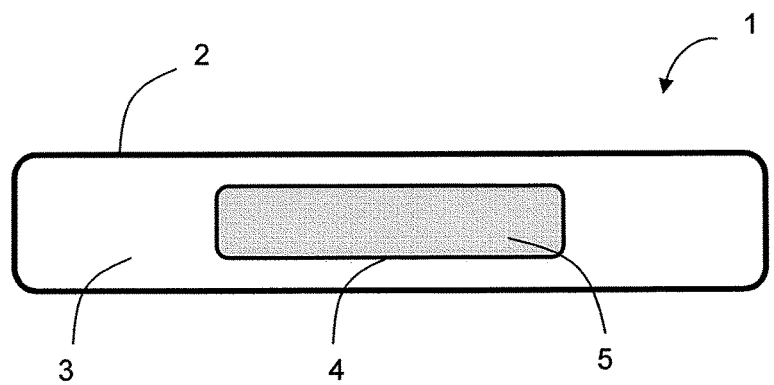
FIG. 3a is a schematic representation of a kit in accordance with the invention.

With reference to FIG. 3a, there is shown a kit according to the invention which is a pillow 1 which has a sealed bag 2 containing dry mixture 3 and capsule 4 containing liquid mixture 5.

Sealed bag 2 is composed of a flexible gas-permeable, liquid non-permeable material such as a perforated polytetrafluoroethylene or polyethylene sheet. Dry mixture 3 is a powdered blend consisting of metakaolin, a muscovite mica and aluminium powder as a blowing agent. Capsule 4 is a rubber balloon filled with liquid mixture 5, which is an aqueous liquid solution consisting of alkali metal silicate and an alkali metal hydroxide as solutes.

Figure 3B:
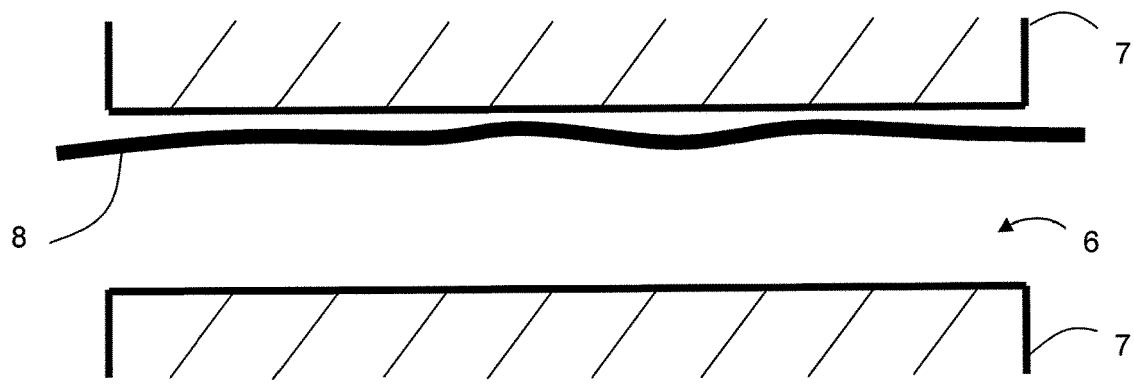
FIG. 3b is a side-on representation of a vertical wall cavity to be filled.

With reference to FIG. 3b, there is shown a side-on, cut away view of cavity 6 in a wall 7. Passing through cavity 6 is electrical cable 8.

Figure 3C:
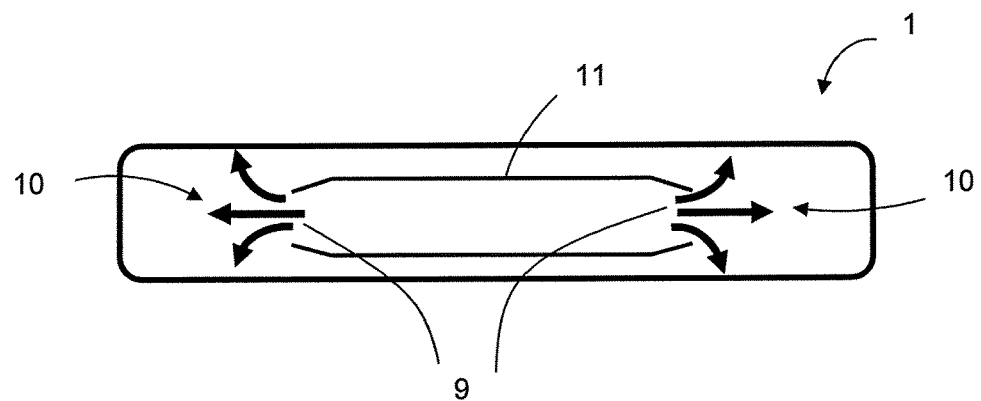
FIG. 3c is a schematic representation of the kit in use.

With reference to FIG. 3c, there is pillow 1 which has been manually manipulated through squeezing such that capsule 4 is broken to permit liquid mixture 5 to contact dry mixture 3 by flowing through ruptures 9 in the direction of arrows 10. Sealed bag is further manipulated to enable thorough mixing of liquid mixture 5 and dry mixture 3, which commences a reaction leading to a cured geopolymeric foam. Ruptured capsule 11 results from capsule 4.

Figure 3D:
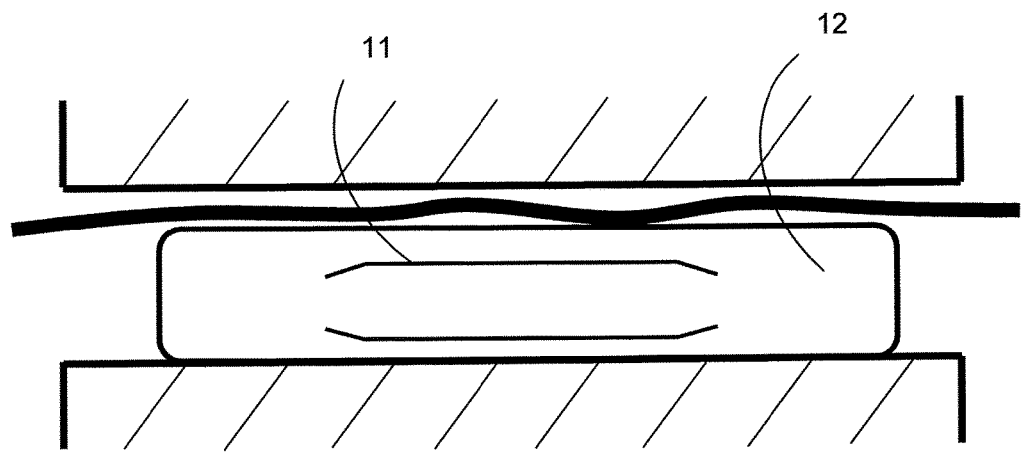
FIGS. 3d and 3e are diagrammatic representations of the kit positioned in the wall cavity.

With reference to FIG. 3d, pillow 1 has ruptured capsule 11 surrounded by curing geopolymer 12. Pillow 1 is inserted into cavity 6 in order to seal cavity 6 and fix in place electrical cable 11 as curing geopolymer 12 cures and expands. Once mixed, the alkaline liquid mixture 5 reacts with the aluminium powder of dry mixture 3 to produce hydrogen gas (not shown) as the foaming gas, which expands curing geopolymer 12. A secondary effect of this reaction is the generation of heat which assists in the curing of geopolymer 12 over a period of time.

Figure 3E:
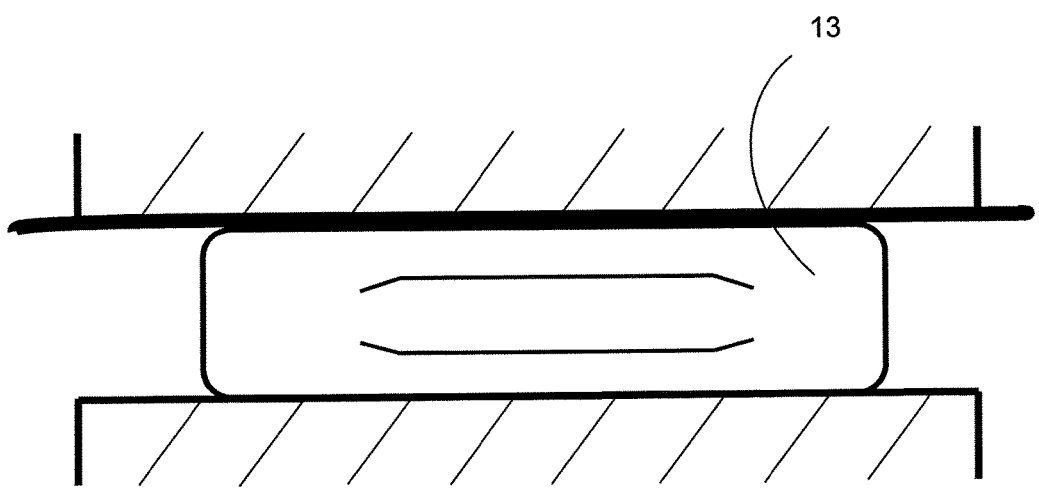

As can be seen from FIG. 3e, after a suitable time period, pillow 1 contains cured geopolymer foam 13 and upon its expansion has substantially filled cavity 6 and secured electrical cable 11 in place wedged between sealed bag 2 and wall 7.

In the event of a fire (not shown), the sealed bag 2 swiftly burns away leaving the cured geopolymer foam 12 remaining intact sealing cavity 6 and retaining the tight fixing grip on electrical cable 8.

The invention claimed is:

1. A kit of parts for preparing a foamed geopolymer for use as a fire-resistant sealant material, comprising:
   (i) a container holding a dry mixture of components suitable for preparing a foamed geopolymer including a blowing agent; and
   (ii) a container holding an aqueous alkaline liquid mixture of components suitable for preparing a geopolymer, wherein:
      (a) container (i) contains a dry mixture comprising:
         20-30% by weight of a metakaolin;
         20-30% by weight of a muscovite mica; and
         0.1-5% by weight of a blowing agent; and
      (b) container (ii) contains an aqueous liquid mixture comprising an alkali metal silicate and an alkali metal hydroxide present in a ratio of 1:2 to 25:1 by weight relative to each other,
   wherein the aqueous liquid mixture is present in container (ii) in an amount 5 to a total of 100% by weight with reference to the dry mixture contents of container (i).

2. The kit according to claim 1, wherein the alkali metal silicate and the alkali metal hydroxide are present in the aqueous liquid mixture of container (ii) in a weight ratio between about 1:2 to 2.1.

3. The kit of parts according to claim 1, wherein the container holding the dry mixture of components comprises a gas-permeable, liquid impermeable material.

4. The kit of parts according to claim 3, wherein the gas-permeable, liquid impermeable material comprises a perforated plastics material.

5. The kit of parts according to claim 4, wherein the perforated plastics material is a polytetrafluoroethylene (PTFE) material or a polyethylene material.

6. The kit of parts according to claim 1, wherein the container holding the aqueous alkaline liquid mixture of components comprises a rupturable rubber material or a rupturable plastics material.

7. The kit of parts according to claim 6, wherein the container is a rubber balloon or pouch.

8. The kit of parts according to claim 1, wherein the container holding the aqueous alkaline liquid mixture of components comprises glass.

9. The kit according to claim 1, wherein the alkali metal silicate and the alkali metal hydroxide are present in the aqueous liquid mixture of container (ii) in a weight ratio of about 1:1.

10. The kit of parts according to claim 1, wherein the container holding the aqueous alkaline liquid mixture of components is situated within the container holding the dry mixture of components.

* * * * *